US012670113B1

(12) United States Patent
Long et al.

(10) Patent No.: US 12,670,113 B1
(45) Date of Patent: Jun. 30, 2026

(54) SYSTEMS AND METHODS FOR CONNECTING COMPUTING DEVICES

(71) Applicant: Apple Inc., Cupertino, CA (US)

(72) Inventors: Scott A Long, Boulder, CO (US); Alain Raynaud, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/797,353

(22) Filed: Aug. 7, 2024

Related U.S. Application Data

(60) Provisional application No. 63/518,775, filed on Aug. 10, 2023, provisional application No. 63/518,769, filed on Aug. 10, 2023.

(51) Int. Cl.
G06F 13/38 (2006.01)

(52) U.S. Cl.
CPC .... G06F 13/385 (2013.01); *G06F 2213/0042* (2013.01)

(58) Field of Classification Search
CPC ..................... G06F 13/385; G06F 2213/0042
See application file for complete search history.

(56) References Cited

U.S. PATENT DOCUMENTS

| | | | | |
|---|---|---|---|---|
| 2012/0226774 | A1* | 9/2012 | Hochsprung | ....... G06F 13/4027 709/217 |
| 2015/0052280 | A1* | 2/2015 | Lawson | ................. G06F 13/28 710/308 |

| | | | | |
|---|---|---|---|---|
| 2016/0217093 | A1* | 7/2016 | Whittington | ........ G06F 13/4282 |
| 2019/0317774 | A1* | 10/2019 | Raghav | ................. G06F 9/4411 |
| 2021/0034526 | A1* | 2/2021 | Pope | ..................... G06F 13/382 |
| 2022/0151022 | A1* | 5/2022 | Chikkur Dattatraya | ..................... H04L 69/323 |
| 2023/0176954 | A1* | 6/2023 | Chiu | .................. G06F 11/2733 714/25 |
| 2025/0053448 | A1* | 2/2025 | Long | ........................ G06F 9/52 |

OTHER PUBLICATIONS

USB Promoter Group, "Universal Serial Bus 4 (USB4®) Specification," Oct. 2022, Version 2.0, 94 pages.
USB Promoter Group, "Universal Serial Bus 4 (USB4®) Connection Manager Guide," Nov. 2022, Version 2.0, 826 pages.

* cited by examiner

*Primary Examiner* — Henry Tsai
*Assistant Examiner* — Aurangzeb Hassan
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to controlling hardware resources over an interface. In some embodiments, a first device performs tasks using one or more included hardware resources, including providing a local control stream that controls operation of the one or more hardware resources. In response to detecting a connection to a second device, the first device offloads the tasks to the second device including transitioning from providing the local control stream to routing, via the interface controller, a remote control stream received from the second device to the one or more hardware resources.

20 Claims, 8 Drawing Sheets

*Interfacing*
*200*

*10*

Interfacing 200

Second Device 150

Interface Controller 210

Host I/F 212A

Data Stream 204

112B Remote Control Stream

Physical Channel 202

Interconnect 142

First Device 100

Hardware Resource(s) 110

112A or B

Host Device I/F 212B

Interface Controller 140

Adapter 214

Second
Device
150
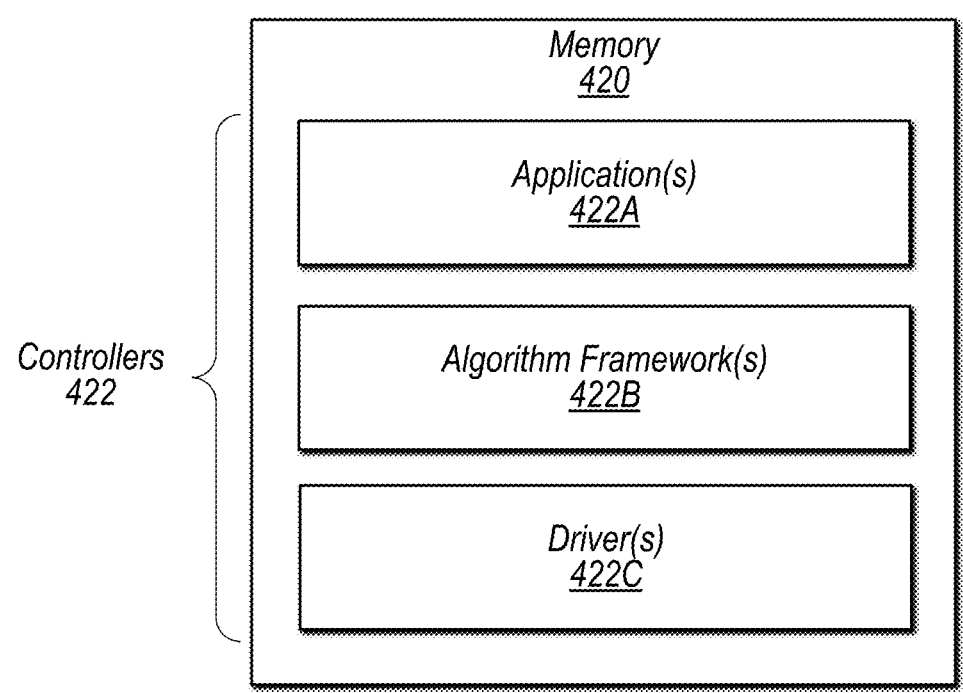
Memory
420
Application(s)
422A
Algorithm Framework(s)
422B
Driver(s)
422C
Controllers
422
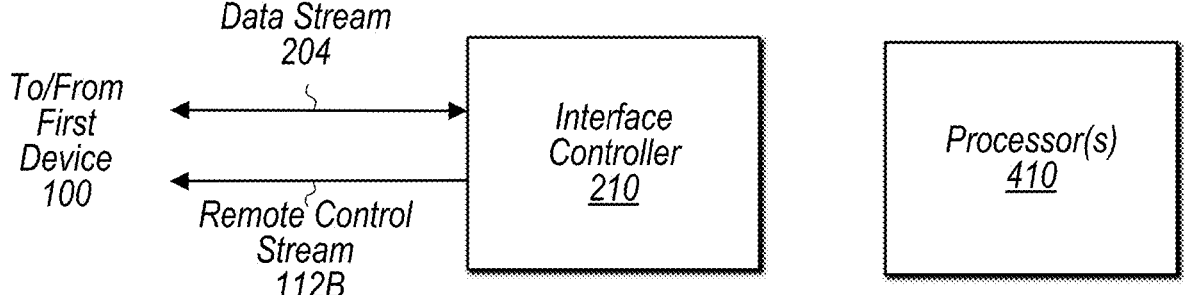
Data Stream
204
To/From
First
Device
100
Remote Control
Stream
112B
Interface
Controller
210
Processor(s)
410
FIG. 4

*600*

Perform Tasks Hardware Resources
Including Providing Local Control
Stream that Controls Operation of
Hardware Resources
<u>610</u>

In Response to Detecting
Connection to Second Device,
Offload Tasks to Second Device
Including Transitioning from
Providing Local Control Stream to
Routing, via Interface Controller, a
Remote Control Stream Received
from Second Device to Hardware
Resources
<u>620</u>

Detect Connection via Interconnect
to First Device that Performs Tasks
Using Hardware Resources
Controlled Using Local Control
Stream Provided via Interface
Controller of First Device
<u>660</u>

In Response to Detecting
Connection, Perform Tasks
Offloaded from First Device,
Including Providing Remote Control
Stream Routed via Interface
Controller to Hardware Resources
<u>670</u>

*FIG. 6B*

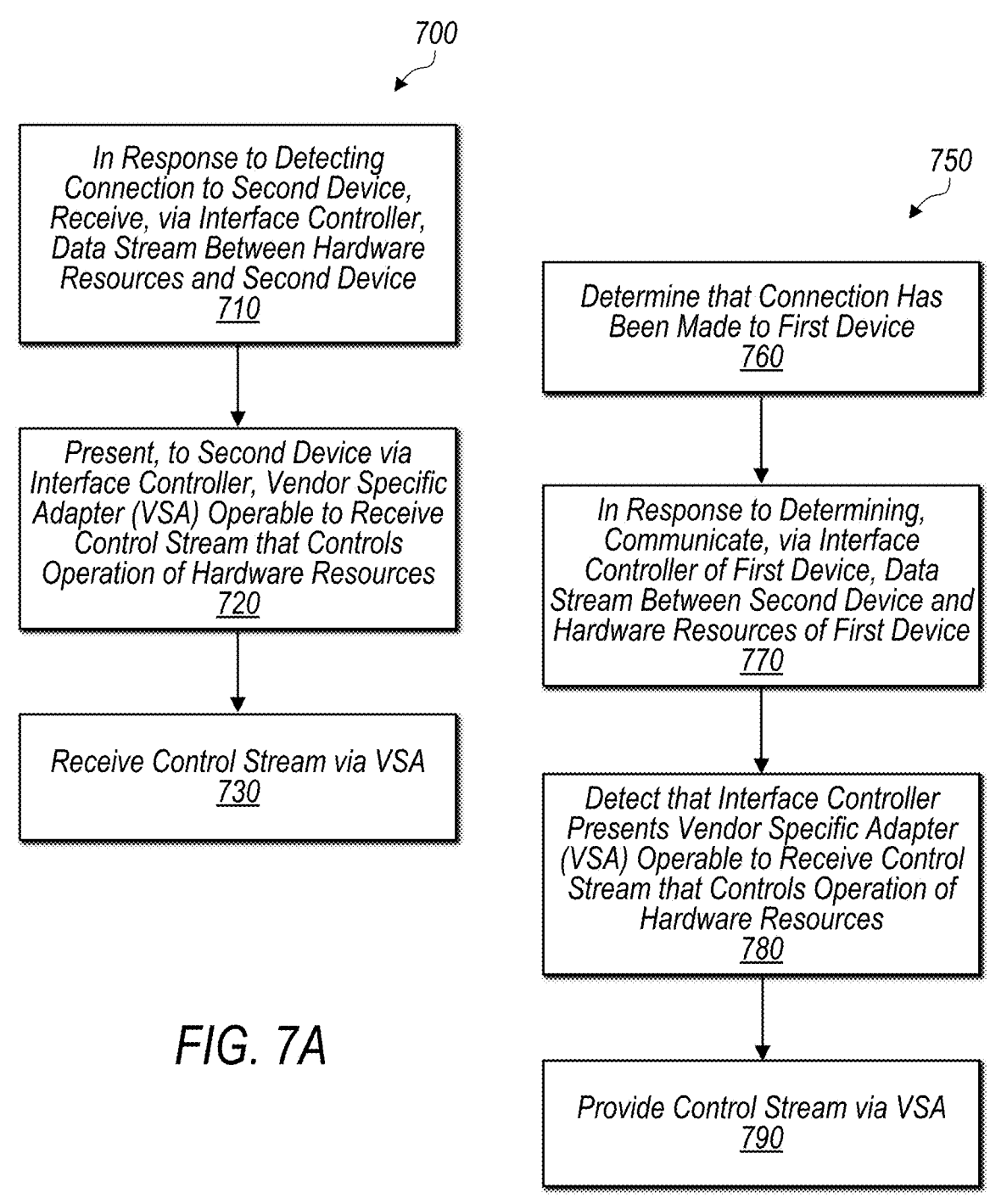

700

In Response to Detecting
Connection to Second Device,
Receive, via Interface Controller,
Data Stream Between Hardware
Resources and Second Device
710

Present, to Second Device via
Interface Controller, Vendor Specific
Adapter (VSA) Operable to Receive
Control Stream that Controls
Operation of Hardware Resources
720

Receive Control Stream via VSA
730

Determine that Connection Has
Been Made to First Device
760

In Response to Determining,
Communicate, via Interface
Controller of First Device, Data
Stream Between Second Device and
Hardware Resources of First Device
770

Detect that Interface Controller
Presents Vendor Specific Adapter
(VSA) Operable to Receive Control
Stream that Controls Operation of
Hardware Resources
780

Provide Control Stream via VSA
790

FIG. 7B

SYSTEMS AND METHODS FOR CONNECTING COMPUTING DEVICES

The present application claims priority to U.S. Prov. Appl. Nos. 63/518,769 and 63/518,775, entitled "Systems and Methods for Connecting Computing Devices," filed Aug. 10, 2023, which are incorporated by reference herein in their entireties.

BACKGROUND

Technical Field

This disclosure relates generally to computer interfaces, and, more specifically, to controlling computer resources via a computer interface.

Description of the Related Art

In the quest to make computing devices portable, devices, such as smart phones, tablets, wearables, etc., may have differing capabilities when compared to nonportable or relatively less portable devices. For example, mobile devices often rely on limited battery capacity and may employ various techniques to reduce power consumption to increase battery life, which may affect performance. Due to their typically smaller sizes, devices may have fewer internal resources for performing various operations and have more limited thermal constraints as cooling systems may need to be small and efficient. As a result, performing resource intense tasks with mobile devices can prove to be more challenging.

BRIEF DESCRIPTION OF THE DRAWINGS

FIG. 4 is a block diagram illustrating an example of components in the second device.

FIGS. 6A-7B are flow diagrams illustrating examples of methods for supporting a companion mode.

DETAILED DESCRIPTION

To overcome various design constraints, a computing device may enlist the help of other, less constrained devices by offloading tasks/workloads to these devices. Offloading some tasks can be challenging, however, when tasks are dependent on particular hardware resources included in a computing device such as displays, speakers, cameras, sensors, etc. These hardware resources may be managed by various internal control structures in the computing device such as drivers, operating system layers, application programming interfaces (APIs), applications, etc. Enabling an external device to integrate with these internal control structures can be difficult as these structures may not be directly accessible (or have limited accessibility) to an external device. Relying on these internal control structures can also limit the amount of work that can be offloaded as these structures still perform, at least, some of the work. Integrating with these structures can further introduce latency as data may flow through additional stack layers, which can be problematic for latency sensitive tasks.

The present disclosure describes embodiments in which a computing device implements a "companion mode" to offload tasks more efficiently to other devices. As will be described below in various embodiments, a first device performing tasks using internal hardware resources can provide a local control stream (e.g., from local drivers, frameworks/algorithms, applications, etc.) that controls operation of the hardware resources. In response to detecting a connection to the second device via an interface controller, the first device offloads the tasks to the second device including transitioning from providing the local control stream to routing, via the interface controller, a remote control stream received from the second device (e.g., from corresponding drivers, frameworks/algorithms, applications, etc. located remotely at the second device) to the hardware resources. In some embodiments, the interface controller supports a standardized protocol (e.g., universal serial bus (USB)) to provide greater integration with other devices. In order to be compliant with the protocol, the first device may present, via the interface controller, a vendor specific adapter (VSA) (e.g., as defined in USB4® version 2.0) operable to receive, from the second device, a remote control stream, which may have a nonstandard packet/frame format.

In many instances, supporting a companion mode as described below can provide a more seamless way to offload work to another device enabling greater power consumption, compute ability, thermal capacity, etc.—and an overall greater user experience.

Figure 1:
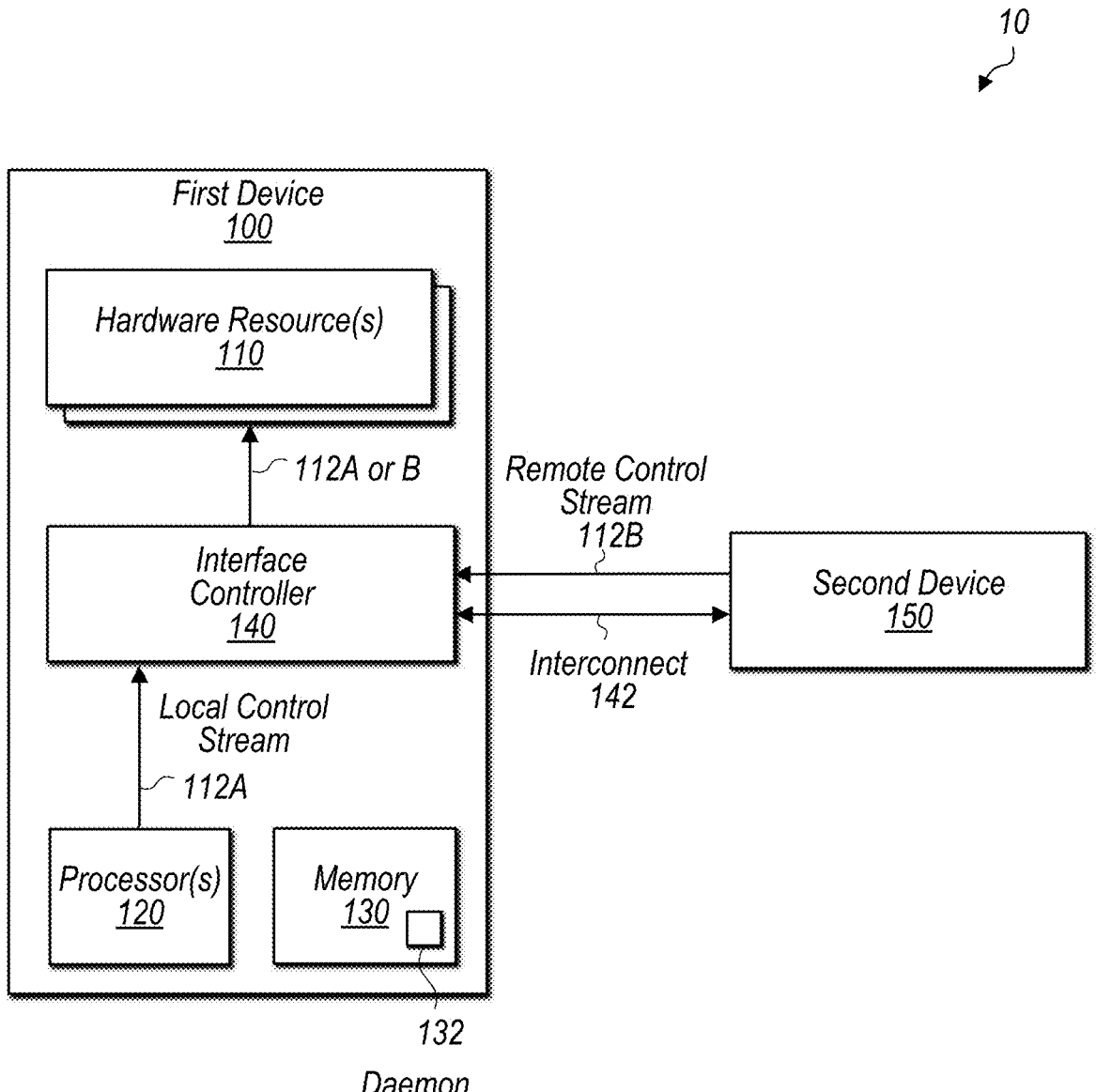
FIG. 1 is a block diagram illustrating an example of a computing system including a first device that supports a companion mode for offloading workloads to a second device.

Turning now to FIG. 1, a block diagram of a computing system 10 for supporting companion mode is depicted. In the illustrated embodiment, system 10 includes a first device 100, which includes hardware resources 110, one or more processors 120, memory 130 including a daemon 132, and interface controller 140. First device 100 may further communicate with a second device 150 via an interconnect 142. In some embodiments, system 10 may be implemented differently than shown such as including additional (or fewer) components, devices, etc.

First device 100 may correspond to any suitable device attempting to perform various tasks/workloads conducive to being offloaded. In some embodiments, first device 100 is a mobile/portable device such as a phone, tablet, handheld, music player, laptop or notebook, personal data assistant (PDA), consumer device, wireless speakers, etc. In some embodiments, device 100 is an internet of things (IoT) device, set-top box, game console, game system, server system, desktop computer, mainframe computer system, workstation, network computer, etc. In some embodiments discussed below, device 100 is a wearable device such as a watch, athletic sensor, or head mounted display (HMD), which may be a headset, helmet, goggles, glasses, a phone inserted into an enclosure, etc. In some embodiments, first device 100 is a vehicle such as an aircraft, marine vessels, recreational vehicles (RVs), automobiles, buses, railed vehicles, spacecraft, robotic devices, trucks, trailers, cranes, caterpillars, etc.

Hardware resources 110 may correspond to various resources used by device 100 to perform tasks. In some embodiments, hardware resources 110 include central processing units (CPUs), graphics processing units (GPUs), neural engine circuits, secure elements, digital signal processors (DSPs), application-specific integrated circuits (ASICs), image signal processors (ISPs), displays, network interface cards (NICs), non-volatile and volatile memory, cameras, displays, audio hardware, input/output devices, sensors (such as world and user sensors discussed below with FIG. 8), etc. Although depicted as hardware, resources 110 may also include software resources such as memory buffers, threads, applications, operating system services, etc. Resources 110 may also include particular data sets used by tasks. In some embodiments, resources 110 may also be located on devices others than first device 100.

In order to enable usage of resources 110, first device 100 may include various control structures that control operation of resources 110. In some embodiments, these controllers include drivers, operating system layers, application programming interfaces (APIs), applications, which, in the illustrated embodiment, may be executable by processor 120 and stored in memory 130. These controllers may provide various commands to hardware resources 110 to enable or disable functionality, perform particular actions, behave in particular manners, etc. The commands may also be accompanied by various parameters controlling how particular actions are performed. In the illustrated embodiment, this controlling information is depicted as local control stream 112A. Specific examples of hardware resources 110, controllers, and their corresponding control data will be discussed in greater detail below with respect to FIGS. 3 and 4.

In various embodiments, first device 100 may have various design constraints enabling it to benefit from offloading work to second device 150 via an interface controller 140 facilitating communication over an interconnect 142.

Second device 150 may correspond to any suitable device or system able to perform offloaded tasks such as those noted above with respect to device 100. In some embodiments, second device 150 is another device belonging to a user of first device 100 such as a user's available phone, tablet, laptop, etc., which may be in the same room or a nearby room. In some embodiments, device 150 may be a nearby compute node, which may provide greater compute ability at greater costs and, in some instances, may be shared by multiple devices 100. For example, a user operating device 100 may enter a retail store having a workstation and/or high-performance compute (HPC) device and may be able to receive assistance from such a node in order to interact with store products in an augmented reality (AR) environment. In some embodiments, second device 150 includes high-performance compute nodes available to a user though cloud-based services such as a server cluster based at a server farm remote from device 100 and implementing one or more services for devices 100. In some embodiments, second device 150 may also be a logical compute node such as a virtual machine, container, etc., which may be provided by a server computer system.

Interface controller 140 may support any suitable communication protocol. In some embodiments controller 140 supports a wired protocol such as Ethernet, Fibre Channel, Universal Serial Bus™ (USB), etc. In other embodiments, interface controller 140 supports a wireless protocol such as Wi-Fi®, Bluetooth®, Long-Term Evolution™, 5G, etc. In some embodiments, the connection may be implemented according to a proprietary wireless communications technology (e.g., 60 gigahertz (GHz) wireless technology) that provides a highly directional wireless link between device 100 and second device 150. In some embodiments, device

100 is configured to select between different available interfaces based on connectivity of the interfaces as well as the particular tasks being offloaded by device 100. For example, if a particular task requires a high amount of bandwidth, device 100 may select an interface supporting the proprietary wireless technology when communicating wirelessly with device 150 and select another technology, such as Wi-Fi®, lower bandwidth is sufficient. In some embodiments, interface controller 140 is also configured to receive power from second device 150, which may be provided via a physical wire such as a USB cable or wirelessly such as a via Qi® charger.

A challenge with offloading tasks from first device 100 to second device 150 can include managing control of hardware resources 110. In some embodiments, second device 150 may continue to use control structures present in first device 100. As noted above, however, using these structures can have various downsides. As a result, first device 100 may support a companion mode in which management of resources 110 is transitioned to second device 150 for particular offloaded tasks.

In illustrated embodiment, first device 100 is configured to implement companion mode using interface controller 140 and a companion mode daemon 132. As shown, first device 100 may initially performing tasks using one or more hardware resources 110 and provide a local control stream 112A to control operation of hardware resources 110. In response to interface controller 140 detecting a connection to second device 150, device 100 can offload one or more of the tasks to second device 150 and can transition from providing local control stream 112A to routing, via interface controller 140, a remote control stream 112B received from second device 150 to one or more hardware resources 110. For example, a hardware resource 110, such as a display, may receive a local control stream 112A including commands from a first instance of a driver, such as display driver, executable by processor 120 and, in response to transitioning to companion mode, receive a remote control stream 112B including commands received from a second instance of the same driver executable by another processor in second device 150, which may perform offloaded intensive graphical processing tasks or other associated tasks. In the illustrated embodiment, both local and remote control streams 112 are routed via interface controller 140; in other embodiments, streams 112 may be routed differently. Daemon 132 may be executed by processor 120 to provide integration between interface controller 140, an operating system of device 100, and/or other components in order to facilitate transitioning into and out of companion mode.

In some embodiments, first device 100 does not offload some tasks (or still uses portions of the control stack on device 100). These tasks may include those better suited for local performance such as thermal management, power management, etc. These tasks may also include those tied to sensitive data such as user authentication, payment transactions, display panel compensation, etc. As a result, some hardware resources 110 may continue to receive a local control stream 112A while others receive remote control stream 112B when in companion mode. In some embodiments, first device 100 may temporarily suspend some tasks being performed locally when a connection is detected in order to offload the tasks more seamlessly to second device 150.

As will be discussed below, interface controller 140 may support a standardized protocol. For example, in some embodiments, interface controller 140 supports USB due to its wide adoption and high performance. In order to be compliant with the standardized protocol, interface controller 140 (or more generally device 100 and/or device 150) may implement various techniques discussed next.

Figure 2:
FIG. 2 is a block diagram illustrating an example of interfacing between the two devices.

Turning now to FIG. 2, a block diagram of an interfacing 200 between devices 100 and 150 is depicted. In illustrated embodiment, devices 100 and 150 are coupled together via one or more physical channels 202 of interconnect 142. Second device 150 also includes an interface controller 210 corresponding to interface controller 140. As will be discussed, this interface controller 210 may provide a host interface 212A while interface controller 140 may provide a device interface 212B having a vendor specific adapter 214. In some embodiments, interfacing 200 may be implemented different than shown.

Wired and wireless protocol standards typically define supported communication distances determined based on design considerations and signal propagation. With the establishment of USB 4.0, for example, the standard increased the permissible lengths for a USB cable over earlier versions of the standard such as USB 2.0. A standard USB 4.0 interconnect, however, still includes two USB 2.0 channels, which, if used, are still restricted to these earlier shorter cable lengths. In various embodiments in which interface controllers 140 and 210 support USB 4.0 (or other protocols with similar restrictions), a user may want to exceed these earlier shorter cable lengths. For example, in an embodiment in which first device 100 is an HMD, a user may want to user a longer cable for interconnect 142 in order to have greater mobility. To this end, interface controllers 140 and 210 may support communicating a remote control stream 112B and a data stream 204 between devices 100 and 150 over a single physical channel 202 supporting a longer cable length (as opposed to communicating the remote control stream 112B over one of the USB 2.0 channels and restricting the cable to the shorter length). As will be described in greater detail with FIG. 5, in some embodiments, interface controllers 140 and 210 use time-division multiplexing (TDM) to communicate data stream 204 and remote control stream 11B via the same physical channel 202. In other embodiments, other motivations may exist for communicating data stream 204 and remote control stream 112B over the same physical channel 202 such as freeing up additional channels, more efficiently using a given physical channel 202, etc. Interface controllers 140 and 210 may also use different techniques for sharing the same physical channel 202 such as frequency-division multiplexing (FDM), channel-division multiplexing (CDM), quadrature amplitude modulation (QAM), etc.

Wired and wireless protocol standards also typically define supported types of traffic and the corresponding manners for communicating those traffic types. For example, the USB standard defines adapters for communicating DisplayPort, Peripheral Component Interconnect Express (PCIe), etc. Some standards, such as USB4® version 2.0, realize that particular vendors adopting a standard may want to communicate types of traffic that are not explicitly defined by the standard and may offer a vendor specific adapter (VSA) for communicating these nonstandard types. In some embodiments in which remote control stream 112B does not fall within one of these standard-supported traffic types, interface controller 140 is configured to present adapter 214 implementing a VSA operable to receive remote control stream 112B from second device 150; interface controller 210 is also configured to detect that interface controller 140 is presenting adapter 214 and provide control stream 112B via adapter 214.

In some wired and wireless protocol, a single device (sometimes referred to as a host, leader, or master) coordinates traffic from other devices over the underlying communication medium in order to avoid traffic collisions. As the number of communicating devices increases over a network, the network may be divided into domains, each controlled by a given host. To avoid conflicting host commands in USB, two hosts may not be permitted to reside within the same domain and may not communicate with one another without a bridge straddling the boundary of two domains, which can add latency. To support bidirectional communication of remote control stream 112B, it may be desirable for interconnect controllers 140 and 210 to use circuitry configured to freeform packets that are not defined in the USB standard. As will be described below with FIG. 3, the USB standard grants this free forming capability to circuitry referred to as a native host interface, which is traditionally responsible for managing the communication medium and can only reside in a host device. In some embodiments, in order to be standard compliant, interface controllers 140 and 210 both include the circuitry for implementing a host interface; however, interface controller 140 masquerades as device interface 212B, so that interface controller 210 is the only device presenting itself as a host interface 212A. In doing so, both interface controllers 140 and 210 can communicate with one another while residing in the same domain and without the aid of a bridge—all while generating free formed packets on both sides and complying with relevant standard requirements.

Figure 3:
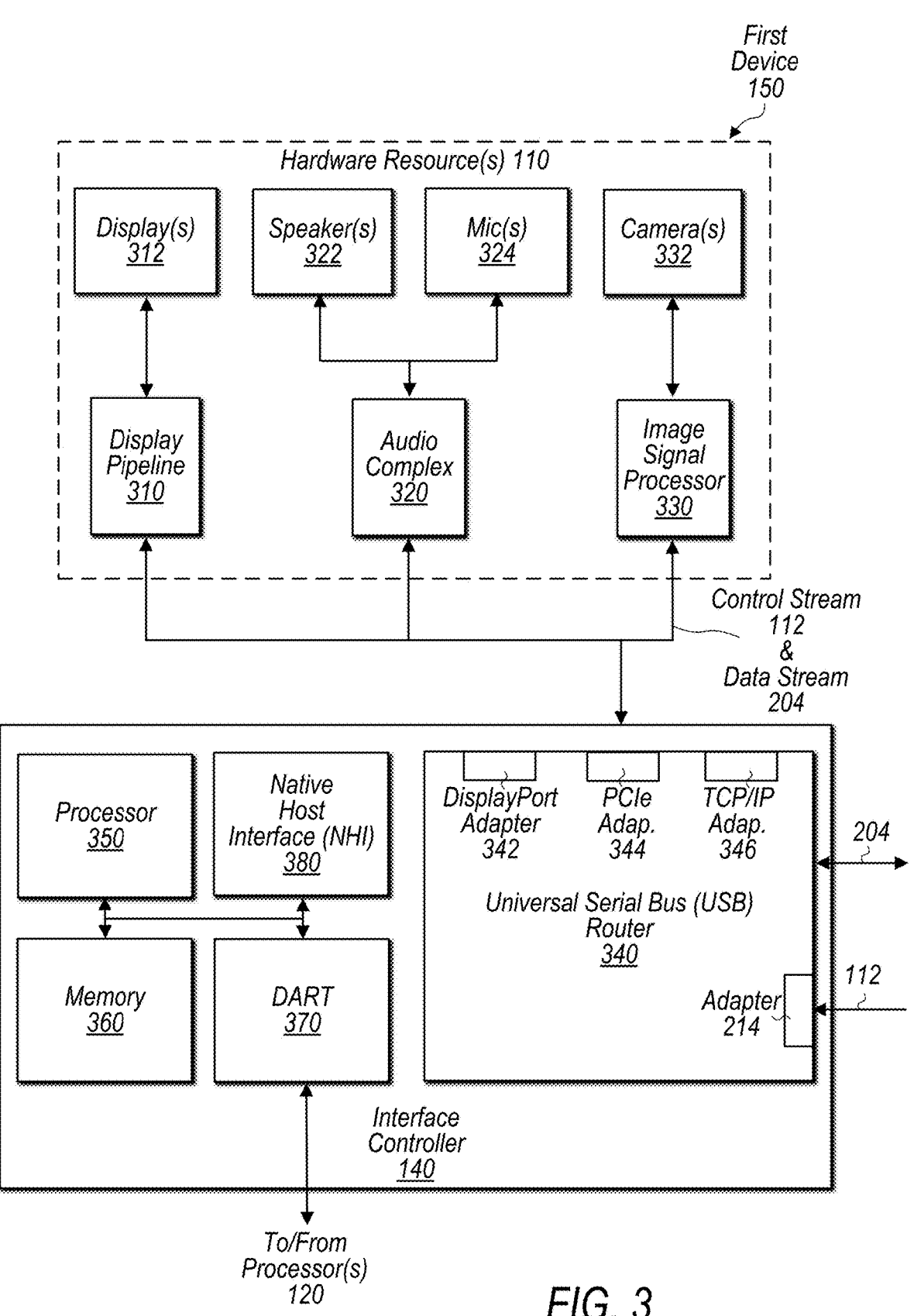
FIG. 3 is a block diagram illustrating an example of components in the first device.

Turning now to FIG. 3, a block diagram of components within device 100 is depicted. In the illustrated embodiment, hardware resources 110 include a display pipeline 310 coupled to one or more displays 312, an audio complex 320 coupled to one or more speakers 322 and/or one or more microphones 324, and an image signal processor 330 coupled to one or more cameras 332. Interface controller 140 includes USB router 340, processor 350, memory 360, device address resolution table 370, and native host interface 380. In some embodiments, device 100 may be implemented differently such as including more (or fewer) components, separate audio complexes may be used for speakers 322 and microphones 324, router 340 may support a protocol other than USB, etc.

Display pipeline 310 is circuitry configured to drive displays 312. Accordingly, display pipeline 310 may be configured to read data from frame buffers and provide streams of pixel values for displays 312. Display pipeline 310 may further include one or more stages to crop frames, perform panel compensation, blend multiple frames to produce output frames, etc. In various embodiments, display pipeline 310 is configured to receive DisplayPort packets included in data stream 204 and including scan line data for presenting scan lines on display 312. Display pipeline 310 may support various commands included in control streams 112 such as commands to enable or display displays 312, adjust the resolution of displays 312, change the brightness of displays 312, etc. As note above and will be discussed with FIG. 5, in some embodiments, control stream 112B and data stream 204 are received such that that packets of control stream 112B are interspersed between DisplayPort packets corresponding to separate scan lines.

Audio complex 320 is circuitry configured to drive speakers 322 and microphones 324. Audio complex 320 may include amplifiers, filters, digital signal processors (DSPs), analog-to-digital convertors (ADCs), digital-to-analog converts (DACs), etc. Audio complex 320 may be configured to receive audio data included in data stream 204 and, based on the audio data, drive speaker 322 to produce a corresponding sound. Audio complex 320 may also generate audio streams from microphones 324 and provide the audio streams for inclusion in data stream 204 being communicated with second device 150. Audio complex 320 may support various commands included in control streams 112 such as commands to enable and disable speakers 322 and microphones 324, adjust the volume of speakers 322, adjust sensitivity of microphones 324, etc.

Image signal processor (ISP) 330 is circuitry configured to process images captured by cameras 332. ISP 330 may perform camera sensor control, filtering, noise reduction, autofocus, autoexposure, lens correction, color compensation, image and video encoding, etc. ISP 330 may provide image/video streams from cameras 332 for inclusion in a data stream 204 being communicated to second device 150 via interface controller 140. ISP 330 may support various commands included in control streams 112 to control operation of ISP 330 and cameras 332 such as commands to enable and disable camera 332, alter resolutions and frame rates of cameras 332, apply particular filters, adjust white balance, etc.

USB router 340 is a circuit configured to route upstream and downstream packets being communicated across interconnect 142 between hardware resources 110 and second device 150. To differentiate between different traffic types, USB router 340 may support multiple adapters/ports such as DisplayPort adapter 342, PCIe adapter 344, TCP/IP adapter 346, and adapter 214. USB router 340 may implement separate queues/ring buffers for each adapter, which may have different priority scheduling and be serviced by separate direct memory access (DMA) controllers to provide different qualities of service (QoS) for adapters. In some embodiments, USB router 340 supports multiplexing multiple data types over the same adapter type such as transporting display data and camera data via upstream and downstream DisplayPort adapters 344. In various embodiments, USB router 340 supports tunning such as transporting internet protocol (IP) traffic over USB. USB router 340 may also support a time synchronization protocol to synchronize timing with second device 150 such as supporting USB's time management unit (TMU). In the illustrated embodiment, processor 350 and memory 360 assist router 340 in implementing various functionality described herein. Device address resolution table (DART) 370 may store address translations usable by an input-output memory management unit (IOMMU) during DMA transactions to translate virtual addresses known by router 340 to physical addresses in memory 130.

Native host interface (NHI) 380 is circuitry configured to present an adapter for sending management packets to control devices communicating over interconnect 142. In embodiments in which interface controller 140 supports USB, these packets may be used for initial topology discovery, creating a domain, and configuring devices detected on interconnect. To generate these packets, NHI 380 may possess the ability to frame data and generate freeform packets that do not fall into a typical format as well as implement other packet related functionality such as cyclic redundancy check (CRC), transport layer, etc. As noted above, however, interface controller 140 is configured, in some embodiments, to repurpose this ability for communicating packets of remote control stream 112B via adapter 214. Thus, NHI 380 may not perform its traditional management role as this can be handled by the NHI in interface controller 210 as it is the only controller presenting a host interface 212A in the domain in which both interfaces 212A and 212B reside. In such an embodiment, as both interface controllers 140 and 210 possess an instance of NHI 380, both controllers 140 and 210 can generate freeform packs on both sides of interconnect 142 while remaining USB standard compliant—and avoiding use of a bridge adding communication latency.

Corresponding components in device 150 that produce remote control stream 112B and communicate data stream 204 will now be discussed.

Turning now to FIG. 4, a block diagram of components within device 150 is depicted. In the illustrated embodiment, second computing device 150 further includes one or more processors 410 and a memory 420 storing program instructions for controllers 422. As shown, controllers 422 may include one or more applications 422A, algorithm frameworks 422B, and drivers 422C. In some embodiments, second device 150 may be implemented differently than shown such as including different controllers 422.

In the illustrated embodiment, controllers 422 are representative of various sources executable by processors 410 to produce remote control stream 112B and—and may further communicate data stream 204. As discussed above, controllers 422 may have a direct correspondence to controllers on first device 100. For example, in some embodiments, first device 100 executes a first instance of a driver 422C providing commands included local control stream 112A; second device 150 executes a second instance of the same driver 422C providing commands included remote control stream 112B. In some embodiments, controllers 422 may even execute on top of the same underlying operating system. For example, in one embodiment, second device 150 supports a special mode in which it suspends execution of a primary operating system used by device 150 and boots a secondary operating system that is the same operating system executed by first device 100. In other embodiments, second device 150 simultaneously executes a host operating system for local use and device 100's operating system as a guest operating system-one or more both of which may be included in a container such as virtual machine managed by a hypervisor.

Applications 422A may correspond to any suitable programs using hardware resources 110. Examples of applications 422A include work applications (e.g., office suites, computer-aided design (CAD), web conferencing, etc.), gaming applications, content-consuming applications (e.g., video streaming, music streaming, etc.), content-recording applications, etc. In some embodiments, applications 422A may include produce extended reality (XR) content depicting an XR environment, which refers to a wholly or partially simulated environment that people sense and/or interact with via an electronic device. For example, the XR environment may include augmented reality (AR) content, mixed reality (MR) content, virtual reality (VR) content, and/or the like. Applications 422A may directly produce remote control stream 112B or may interface with other lower level components such as frameworks 422B and drivers 422C, which produce remote control stream 112B.

Algorithm frameworks 422B provide various functionality that can be requested by other applications, such as applications 422A, via one or more application programing interfaces (APIs) without the applications having to incorporate program instructions for those functions directly. For example, an application wanting to use objection-classification for video frames being recorded by cameras 332 can use a corresponding system framework 422B to implement this functionality without the developer of the application having to write program instructions to, for example, create a neural network classifier, etc. In some embodiments in which first device 100 is an HMD and/or presents XR content, frameworks 422B may support various reality algorithms. These algorithms may include a visual inertial odometry (VIO) algorithm that determines an orientation of device 100 using cameras 332 and inertial measurement unit (IMU) sensors, which may also be hardware resources 110. These algorithms may include a gaze algorithm that tracks position and movement of the user's eyes by using one or more eye tracking sensors (e.g., infrared (IR) cameras 332 with an IR illumination source, which may be a hardware resource 110)—as well as other components of a user's face such as the user's mouth/jaw, brow, etc. These algorithms may include a hand algorithm that tracks position, movement, and gestures of the user's hands, fingers, and/or arms by using one or more hand sensors (e.g., IR cameras 332 with IR illumination). In some embodiments, frameworks 422B may directly produce remote control stream 112B or may interface with other lower level components such as drivers 422C.

Drivers 422C are program instructions executable to interface specific underlying hardware resources 110 with higher level software and may be integrated into an operating system kernel. Sometimes, drivers 422C are packaged as firmware. In some embodiments, drivers 422C include drivers for displays 312, audio drivers for controlling audio complex 320, camera drivers for controlling cameras 332, GPU drivers for graphics operations, a neural engine driver for performing machine learning operations, network interface drivers, and sensor drivers such as for sensors discussed below with respect to FIG. 8, etc.

An example of communicating data stream 204 and remote control stream 112B over the same physical channel 202 using time division multiplexing by interface controllers 140 and 210 will be discussed next.

Figure 5:
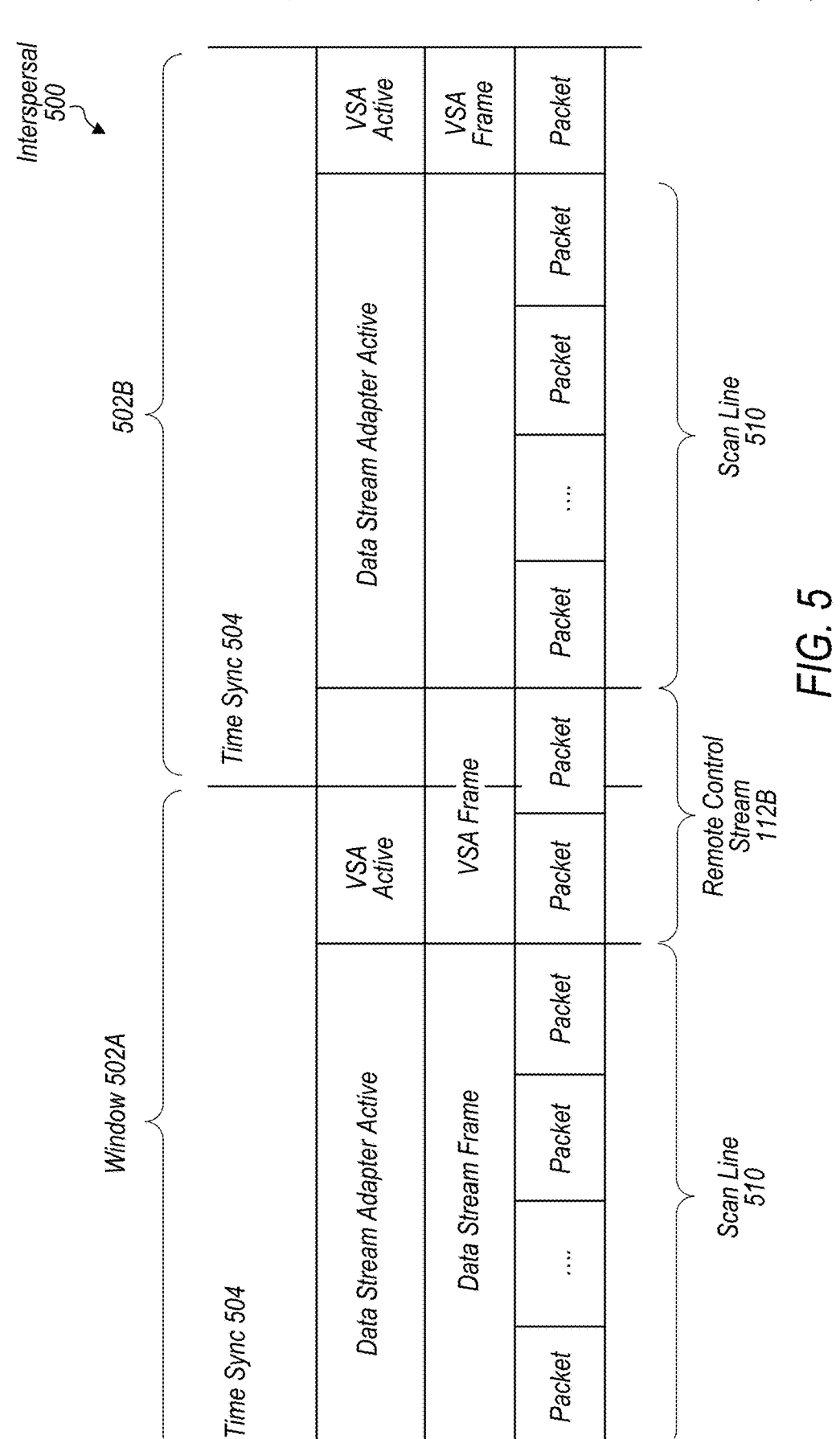
FIG. 5 is a timeline diagram illustrating an example of a packet interspersal of data-stream and control-stream packets.

Turning now to FIG. 5, a timing diagram of a packet interspersal 500 is depicted. As shown, interspersal 500 may have a repeating window 502 in which a data stream adapter 342-246 is active and adapter 214 implementing a VSA is active—meaning their respective packets are being communicated. Each window 502 may begin with a time synchronization 504 (e.g., using TMU) in order to coordinate traffic communication between hardware resources 110, interface controller 140, and interface controller 210. As time synchronization information may be included in remote control stream 112B and occur at a regular cadence, interface controllers 140 and 210 may schedule adapter 214 to be active, so that timing synchronization 504 exchanged via interconnect 142 occurs at an appropriate time. After a time sync 504 occurs in initial window 502A, a data stream adapter 342-246 becomes active during which interface controller 140 may receive a frame of data associated with a data stream 204 and encapsulates the data as a payload in a stream of packets communicated via interconnect 142. In some embodiments, when communicating traffic for displays 312 (e.g., DisplayPort (DP) packets via DisplayPort adapter 342), interface controller 140 sends a particular number of packets sufficient to convey a complete scanline of pixel data for displays 312. While displays 312 are presenting a scanline, sufficient time is available to convey one or more packets of control stream 112B for adapter 214. As shown, window 502 may not directly align with an exact number of packets. In some embodiments, interface controller 140 permits a packet of control stream 112B to overflow into next window 502B as shown as long as interface controller 140 able to still communicate a complete scanline within window 502B. By using time-division multiple access (TDMA) as depicted, interface controllers 140 and 210 are able to communicate remote control stream 112B and data stream 204 from multiple adapters via a single physical channel, which may allow for greater utilization of interconnect 142 and, in the case of USB4® version 2.0, greater length cables to be used.

Turning now to FIG. 6A, a flow diagram of a method 600 is depicted. Method 600 is one embodiment of a method performed by a first device, such as device 100, interacting with a second device, such as device 150. In some embodiments, performance of method 600 may achieve various ones of the benefits noted above.

In step 610, the first device performs tasks using one or more hardware resources (e.g., hardware resources 110). In various embodiments, performing the tasks includes providing, to the one or more hardware resources, a local control stream (e.g., local control stream 112A) that controls operation of the one or more hardware resources.

In step 620, in response to detecting a connection to the second device, the first device offloads the tasks to the second device including transitioning from providing the local control stream to routing, via an interface controller (e.g., interface controller 140), a remote control stream (e.g., remote control stream 112B) received from the second device to the one or more hardware resources. In some embodiments, the local control stream includes commands received from a first instance of a driver (e.g., a driver 422C at device 100) executable by a first processor of the first device; the remote control stream includes commands received from a second instance of the driver (e.g., a driver 422C at device 150) executable by the second device. In some embodiments, the one or more hardware resources include an audio complex (e.g., audio complex 320) configured to drive one or more speakers (e.g., speakers 322) coupled to the first device; the remote control stream includes commands from the second device to control operation of the audio complex. In some embodiments, the one or more hardware resources includes a microphone (e.g., microphones 324); the remote control stream includes commands to enable and disable the microphone. In some embodiments, the one or more hardware resources includes a camera (e.g., camera 332); the remote control stream includes commands from the second device to control operation of the camera. In some embodiments, in response to detecting the connection to the second device, the first device presents, to the second device via the interface controller, a vendor specific adapter (VSA) (e.g., adapter 214) operable to receive the remote control stream and receives the remote control stream via the VSA. In some embodiments, the first device coordinates communication between the one or more hardware resources and the interface controller based on time synchronization information included in the control stream. In various embodiments, the interface controller is configured to receive power from the second device. In some embodiments, the first device is a head mounted display (HMD) configured to present extended reality (XR) content provided by the second device.

In various embodiments, the interface controller is configured to communicate, from the second device, the remote control stream and a data stream (e.g., data stream 204) for the one or more hardware resources via a single physical channel shared using time-division multiplexing. In some embodiments, the one or more hardware resources include a display (e.g., display 312), the data stream includes DisplayPort (DP) packets including data for presenting scan lines on the display, and the remote control stream and the data stream are communicated such that that packets of the control stream are interspersed (e.g., packet interspersal 500) between DP packets corresponding to separate scan lines.

In various embodiments, method 600 further includes performing a task using a local instance of a framework (e.g., framework 422B) executable to implement an algorithm that processes a data stream received from the camera. In such an embodiment, the local instance of the framework provides commands for inclusion in the local control stream. The method 600 further includes receiving, from a corresponding instance of the framework at the second device, commands included in the control stream for the camera. In some embodiments, the framework is executable to implement a visual inertial odometry (VIO) algorithm. In some embodiments, the framework is executable to implement a hand tracking algorithm or a gaze tracking algorithm.

Turning now to FIG. 6B, a flow diagram of a method 650 is depicted. Method 650 is one embodiment of a method performed by a second device, such as device 150, interacting with a first device, such as device 100. In some embodiments, performance of method 600 may achieve various ones of the benefits noted above. Method 650 begins in step 660 with the second device detecting a connection via an interconnect (e.g., interconnect 142) to a first device that performs tasks using one or more hardware resources (e.g., hardware resources 110) that are controlled using a local control stream (e.g., local control stream 112A) provided via an interface controller (e.g., interface controller 140) of first device. In step 670, in response to detecting the connection, the second device performs the tasks offloaded from the first device, including providing a remote control stream (e.g., remote control stream 112B) that is routed via the interface controller to the one or more hardware resources.

Turning now to FIG. 7A, a flow diagram of a method 700 is depicted. Method 700 is one embodiment of a method performed by a first device, such as device 100, interacting with a second device, such as device 150. In some embodiments, performance of method 700 may achieve various ones of the benefits noted above.

In step 710, in response to detecting a connection to the second device, the first device communicates, via an interface controller (e.g., interface controller 140), a data stream (e.g., data stream 204) between one or more hardware resources (e.g., hardware resources 110) and the second device.

In step 720, the first device presents, to the second device via the interface controller, a vendor specific adapter (VSA) (e.g., adapter 214) operable to receive a control stream (e.g., remote control stream 112B) that controls operation of the one or more hardware resources. In various embodiments, the received control stream includes commands from a driver (e.g., driver 422C) executing on the second device. In some embodiments, the one or more hardware resources includes a camera (e.g., camera 332) configured to provide a video data stream via the interface controller to the second device; the control stream includes commands to control the camera. In some embodiments, the one or more hardware resources includes audio hardware (e.g., audio complex 320) configured to receive audio data included in the data stream and, based on the audio data, drive a speaker (e.g., speaker 322) to produce a corresponding sound; the control stream includes commands to control the audio hardware. In some embodiments, the one or more hardware resources includes a microphone (e.g., microphone 324) configured to provide an audio data stream via the interface controller to the second device; the control stream includes commands to enable and disable the microphone. In some embodiments, the first device is a head mounted display (HMD) (e.g., HMD 800), one or more hardware resources includes one or more sensors (e.g., world sensors 804 and user sensor 806) mounted in the HMD, and the control stream includes commands to control operation of the one or more sensors.

In step 730, the first device receives the control stream via the VSA. In various embodiments, the interface controller includes a first native host interface (NHI) adapter that presents the VSA to a second NHI adapter in another interface controller (e.g., interface controller 210) in the second device and receives the control stream from the second NHI adapter. In some embodiments, the first and second NHI adapters are within the same domain. In some embodiments, the interface controller presents the first device as a universal serial bus (USB) device (e.g., device interface 212B) on an interconnect (e.g., interconnect 142) established with the second device and receives, from the other interface controller, information identifying the second device as a host (e.g., host interface 212A) on the interconnect. In some embodiments, the interface controller receives the data stream and the control stream via a single universal serial bus (USB) channel (e.g., physical channel 202). In some embodiments, the one or more hardware resources include a display (e.g., display 312), the data stream includes DisplayPort (DP) packets that include scan line data for presenting scan lines on the display, and the control stream and the data stream are received such that that packets of the control stream are interspersed (e.g., packet interspersal 500) between DP packets corresponding to separate scan lines (e.g., scan lines 510).

Turning now to FIG. 7B, a flow diagram of a method 750 is depicted. Method 750 is one embodiment of a method performed by a second device, such as device 150, interacting with a first device, such as device 100. In some embodiments, performance of method 750 may achieve various ones of the benefits noted above. Method 750 begins in step 760 with the second device determining that a connection has been made to a first device. In step 770, in response to the determining, the second device communicates, via an interface controller (e.g., interface controller 140) of the first device, a data stream (e.g., data stream 204) between the second device and one or more hardware resources (e.g., hardware resources 110) of the first device. In step 780, the second device detects that the interface controller presents a vendor specific adapter (VSA) (e.g., adapter 214) operable to receive a control stream (e.g., remote control stream 112B) that controls operation of the one or more hardware resources. In step 790, the second device provides the control stream via the VSA.

Exemplary Computer System

Figure 8:
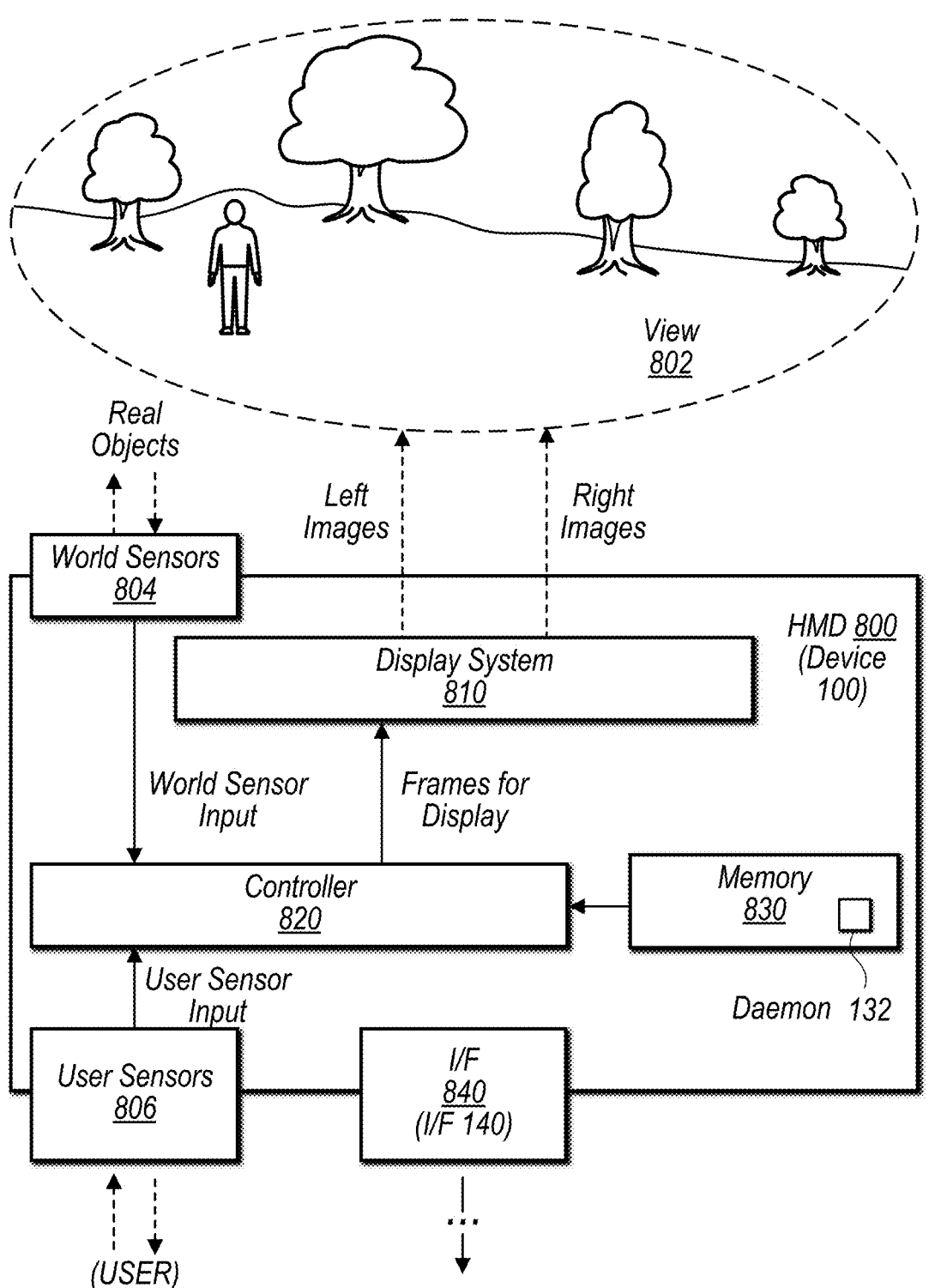
FIG. 8 is a block diagram illustrating an exemplary device, which may implement functionality described herein.

Turning now to FIG. 8, a block diagram of components within computing device, which may implement functionality of device 800 (or device 150), is depicted. In the illustrated embodiment, computing device 800 is depicted as a head-mounted display (HMD) configured to be worn on the head and to display content, such as an extended reality (XR) view 802 of an XR environment, to a user. For example, HMD 800 may be a headset, helmet, goggles, glasses, a phone inserted into an enclosure, etc. worn by a user. Computing device 800, however, may correspond to other devices in other embodiments, which may (or may not) be presenting XR content. In the illustrated embodiment, HMD 800 includes world sensors 804, user sensors 806, a display system 810, controller 820, memory 830, and a network interface 840. In some embodiments, HMD 800 may be implemented differently than shown. For example, HMD 800 may include multiple interfaces 840, controller 820 may be implemented using multiple processors, etc.

World sensors 804 are sensors configured to collect various information about the environment in which a user wears HMD 800. In some embodiments, world sensors 804 may include one or more visible-light cameras that capture video information of the user's environment. This information also may, for example, be used to provide an XR view 802 of the real environment, detect objects and surfaces in the environment, provide depth information for objects and surfaces in the real environment, provide position (e.g., location and orientation) and motion (e.g., direction and velocity) information for the user in the real environment, etc. In some embodiments, HMD 800 may include left and right cameras located on a front surface of the HMD 800 at positions that are substantially in front of each of the user's eyes. In other embodiments, more or fewer cameras may be used in HMD 800 and may be positioned at other locations.

In some embodiments, world sensors 804 may include one or more world mapping sensors (e.g., infrared (IR) sensors with an IR illumination source, or Light Detection and Ranging (LIDAR) emitters and receivers/detectors) that, for example, capture depth or range information for objects and surfaces in the user's environment. This range information may, for example, be used in conjunction with frames captured by cameras to detect and recognize objects and surfaces in the real-world environment, and to determine locations, distances, and velocities of the objects and surfaces with respect to the user's current position and motion. The range information may also be used in positioning virtual representations of real-world objects to be composited into an XR environment at correct depths. In some embodiments, the range information may be used in detecting the possibility of collisions with real-world objects and surfaces to redirect a user's walking. In some embodiments, world sensors 804 may include one or more light sensors (e.g., on the front and top of HMD 800) that capture lighting information (e.g., direction, color, and intensity) in the user's physical environment. This information, for example, may be used to alter the brightness and/or the color of the display system in HMD 800.

User sensors 806 are sensors configured to collect various information about a user wearing HMD 800. In some embodiments, user sensors 806 may include one or more head pose sensors (e.g., IR or RGB cameras) that may capture information about the position and/or motion of the user and/or the user's head. The information collected by head pose sensors may, for example, be used in determining how to render and display views 802 of the XR environment and content within the views. For example, different views 802 of the environment may be rendered based at least in part on the position of the user's head, whether the user is currently walking through the environment, and so on. As another example, the augmented position and/or motion information may be used to composite virtual content into the scene in a fixed position relative to the background view of the environment. In some embodiments there may be two head pose sensors located on a front or top surface of the HMD 800; however, in other embodiments, more (or fewer) head-pose sensors may be used and may be positioned at other locations.

In some embodiments, user sensors 806 may include one or more eye tracking sensors (e.g., IR cameras with an IR illumination source) that may be used to track position and movement of the user's eyes. In some embodiments, the information collected by the eye tracking sensors may be used to adjust the rendering of images to be displayed, and/or to adjust the display of the images by the display system of the HMD 800, based on the direction and angle at which the user's eyes are looking. In some embodiments, one or more of these eye tracking sensors may be used to implement a biosensor for biometrically authenticating a user. In some embodiments, the information collected by the eye tracking sensors may be used to match direction of the eyes of an avatar of the user to the direction of the user's eyes. In some embodiments, brightness of the displayed images may be modulated based on the user's pupil dilation as determined by the eye tracking sensors. In some embodiments, user sensors 806 may include one or more eyebrow sensors (e.g., IR cameras with IR illumination) that track expressions of the user's eyebrows/forehead. In some embodiments, user sensors 806 may include one or more lower jaw tracking sensors (e.g., IR cameras with IR illumination) that track expressions of the user's mouth/jaw. For example, in some embodiments, expressions of the brow, mouth, jaw, and eyes captured by sensors 806 may be used to simulate expressions on an avatar of the user in a co-presence experience and/or to selectively render and composite virtual content for viewing by the user based at least in part on the user's reactions to the content displayed by HMD 800.

In some embodiments, user sensors 806 may include one or more hand sensors (e.g., IR cameras with IR illumination) that track position, movement, and gestures of the user's hands, fingers, and/or arms. For example, in some embodiments, detected position, movement, and gestures of the user's hands, fingers, and/or arms may be used to simulate movement of the hands, fingers, and/or arms of an avatar of the user in a co-presence experience. As another example, the user's detected hand and finger gestures may be used to determine interactions of the user with virtual content in a virtual space, including but not limited to gestures that manipulate virtual objects, gestures that interact with virtual user interface elements displayed in the virtual space, etc. In some embodiments, hardware resources 110 include world sensors 804 and user sensors 806.

Display system 810 is configured to display rendered frames to a user. Display 810 may implement any of various types of display technologies. For example, as discussed above, display system 810 may include near-eye displays that present left and right images to create the effect of three-dimensional view 802. In some embodiments, near-eye displays may use digital light processing (DLP), liquid crystal display (LCD), liquid crystal on silicon (LCoS), or light-emitting diode (LED). As another example, display system 810 may include a direct retinal projector that scans frames including left and right images, pixel by pixel, directly to the user's eyes via a reflective surface (e.g., reflective eyeglass lenses). To create a three-dimensional effect in view 802, objects at different depths or distances in the two images are shifted left or right as a function of the triangulation of distance, with nearer objects shifted more than more distant objects. Display system 810 may support any medium such as an optical waveguide, a hologram medium, an optical combiner, an optical reflector, or any combination thereof. In some embodiments, display system 810 may be transparent or translucent and be configured to become opaque selectively.

Controller 820 includes circuitry configured to facilitate operation of HMD 800. Accordingly, controller 820 may include one or more processors configured to execute program instructions to cause HMD 800 to perform various operations described herein such as those associated with companion mode daemon 132. These processors may be CPUs configured to implement any suitable instruction set architecture and may be configured to execute instructions defined in that instruction set architecture. For example, in various embodiments controller 820 may include general-purpose or embedded processors implementing any of a variety of instruction set architectures (ISAs), such as ARM, x86, PowerPC, SPARC, RISC, or MIPS ISAs, or any other suitable ISA. In multiprocessor systems, each of the processors may commonly, but not necessarily, implement the same ISA. Controller 820 may employ any microarchitecture, including scalar, superscalar, pipelined, superpipelined, out of order, in order, speculative, non-speculative, etc., or combinations thereof. Controller 820 may include circuitry to implement microcoding techniques. Controller 820 may include one or more levels of caches, which may employ any size and any configuration (set associative, direct mapped, etc.).

In some embodiments, controller 820 may include a GPU, which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 820 may include one or more other components for processing and rendering video and/or images, for example image signal processors (ISPs), coder/decoders (codecs), etc. In some embodiments, controller 820 may be implemented as a system on a chip (SOC).

Memory 830 is a non-transitory computer readable medium configured to store data and program instructions executed by processors in controller 820 such as those facilitating the authentication techniques described herein. Memory 830 may include any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. Memory 830 may also be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Network interface 840, in various embodiments, includes one or more interfaces configured to communicate with external entities. Network interface 840 may support any suitable wireless technology such as Wi-Fi®, Bluetooth®, Long-Term Evolution™, etc. or any suitable wired technology such as Ethernet, Fibre Channel, Universal Serial Bus™ (USB) etc. In some embodiments, interface 840 may implement a proprietary wireless communications technology (e.g., 90 gigahertz (GHz) wireless technology) that provides a highly directional wireless connection. In some embodiments, HMD 800 may select between different available network interfaces based on connectivity of the interfaces as well as the particular user experience being delivered by HMD 800. For example, if a particular user experience requires a high amount of bandwidth, HMD 800 may select a radio supporting the proprietary wireless technology when communicating wirelessly to stream higher quality content. If, however, a user is merely a lower-quality movie, Wi-Fi® may be sufficient and selected by HMD 800. In some embodiments, HMD 800 may use compression to communicate in instances, for example, in which bandwidth is limited.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

What is claimed is:

1. A first device, comprising:

a first processor;

one or more hardware resources;

an interface controller configured to connect to a second device; and memory having program instructions stored therein that are executable by the first processor to cause the first device to perform operations including:

in response to detecting a connection to the second device:

communicating, via the interface controller, a data stream between the one or more hardware resources and the second device;

presenting, to the second device via the interface controller, a vendor specific adapter (VSA) operable to receive a control stream that controls operation of the one or more hardware resources, wherein the interface controller includes a first native host interface (NHI) adapter configured to present the VSA to a second NHI adapter in another interface controller in the second device; and receiving the control stream via the VSA, and wherein the first native host interface (NHI) adapter is configured to receive the control stream from the second NHI adapter.

2. The first device of claim 1, wherein the first and second NHI adapters are within the same domain.

3. The first device of claim 1, wherein the interface controller is configured to:

present the first device as a universal serial bus (USB) device on an interconnect established with the second device; and receive, from the other interface controller, information identifying the second device as a host on the interconnect.

4. The first device of claim 1, wherein the interface controller is configured to:

receive the data stream and the control stream via a single universal serial bus (USB) channel.

5. The first device of claim 4, wherein the one or more hardware resources includes a display;

wherein the data stream includes DisplayPort (DP) packets that include scan line data for presenting scan lines on the display; and wherein the control stream and the data stream are received such that packets of the control stream are interspersed between DP packets corresponding to separate scan lines.

6. The first device of claim 1, wherein the received control stream includes commands from a driver executing on the second device.

7. The first device of claim 1, wherein the one or more hardware resources includes a camera configured to provide a video data stream via the interface controller to the second device; and wherein the control stream includes commands to control the camera.

8. The first device of claim 1, wherein the one or more hardware resources includes audio hardware configured to:

receive audio data included in the data stream; and based on the audio data, drive a speaker to produce a corresponding sound; and wherein the control stream includes commands to control the audio hardware.

9. The first device of claim 1, wherein the one or more hardware resources includes a microphone configured to provide an audio data stream via the interface controller to the second device; and wherein the control stream includes commands to enable and disable the microphone.

10. The first device of claim 1, wherein the first device is a head mounted display (HMD);

wherein the one or more hardware resources includes one or more sensors mounted in the HMD; and wherein the control stream includes commands to control operation of the one or more sensors.

11. A non-transitory computer readable medium having program instructions stored therein that are executable by a first device to cause the first device to perform operations comprising:

in response to detecting a connection to a second device:

communicating, via an interface controller of the first device, a data stream between one or more hardware resources and the second device;

presenting, to the second device via the interface controller, a vendor specific adapter (VSA) operable to receive a control stream that controls operation of the one or more hardware resources, wherein the VSA is presented, via a first native host interface (NHI) adapter of the interface controller, to a second NHI adapter in another interface controller in the second device; and receiving the control stream via the VSA and from the second NHI adapter.

12. The computer readable medium of claim 11, wherein the first and second NHI adapters are within the same domain.

13. The computer readable medium of claim 11, wherein the operations further comprise:

presenting, via the interface controller, the first device as a universal serial bus (USB) device on an interconnect established with the second device; and receiving, from the other interface controller, information identifying the second device as a host on the interconnect.

14. The computer readable medium of claim 11, wherein the operations further comprise:

receiving, via the interface controller, the data stream and the control stream via a single universal serial bus (USB) channel;

wherein the data stream includes DisplayPort (DP) packets that include scan line data for presenting scan lines on a display; and wherein the control stream and the data stream are received such that packets of the control stream are interspersed between DP packets corresponding to separate scan lines.

15. The computer readable medium of claim 11, wherein the received control stream includes commands from a driver executing on the second device.

16. A method, comprising:

determining, by a second device, that a connection has been made to a first device;

in response to the determining:

communicating, by the second device via an interface controller of the first device, a data stream between the second device and one or more hardware resources of the first device;

detecting, by the second device, that the interface controller presents a vendor specific adapter (VSA) operable to receive a control stream that controls operation of the one or more hardware resources;

receiving, from a first native host interface (NHI) adapter in the interface controller, the VSA at a second NHI adapter in another interface controller in the second device; and providing, by the second NHI adapter, the control stream via the VSA.

17. The method of claim 16, wherein the first and second NHI adapters are within the same domain.

18. The method of claim 16, further comprising:

providing, by the second device, the data stream and the control stream via a single universal serial bus (USB) channel.

19. The method of claim 16, wherein the provided control stream includes commands from a driver executing on the second device.

20. The method of claim 16, wherein the first device is a head mounted display (HMD);

wherein the one or more hardware resources includes one or more sensors mounted in the HMD; and wherein the control stream includes commands to control operation of the one or more sensors.

\* \* \* \* \*